United States Patent

Schaeren

[15] 3,669,984

[45] June 13, 1972

[54] PROCESS FOR THE PREPARATION OF 4-METHYL-5-ALKOXY-OXAZOLES

[72] Inventor: Sidney Frank Schaeren, Benken, Switzerland

[73] Assignee: Hoffmann-La Roche Inc., Nutley, N.J.

[22] Filed: March 12, 1970

[21] Appl. No.: 19,110

[30] Foreign Application Priority Data

March 25, 1969 Switzerland ..........................4464/69

[52] U.S. Cl. .......................................260/307 R
[51] Int. Cl. ......................................C07d 85/44
[58] Field of Search .............................260/307 R

[56] References Cited

UNITED STATES PATENTS 3,413,297  11/1968  Miki et al............................260/294.9
3,560,516  2/1971   Yoshida et al.........................260/307

*Primary Examiner*—Henry R. Jiles
*Assistant Examiner*—R. V. Rush
*Attorney*—Samuel L. Welt, Jon S. Saxe, Bernard S. Leon, William H. Epstein and George M. Gould

[57] ABSTRACT

A process for the preparation of 4-methyl-5-alkoxy-oxazoles from 5-alkoxy-4-oxazolylacetic acids, which products are useful as intermediates for the preparation of pyridoxine. The starting materials are heated at a temperature of 100°–150° C. in the presence of a dienophile (A-HC═CH-B, wherein A and B are trans and each is an electron-withdrawing group) until evolution of $CO_2$ ceases.

6 Claims, No Drawings

PROCESS FOR THE PREPARATION OF 4-METHYL-5-ALKOXY-OXAZOLES

This invention relates to the preparation of heterocyclic compounds of Formula I many compounds of which are useful in preparing pyridoxine [3-hydroxy-4,5-di(hydroxy-methyl)-2-methyl pyridine] or vitamin $B_6$ as it is often designated. The heterocyclic compounds of Formula I belong to a class of known compounds which compounds are, for example, useful as intermediate products in the synthesis of pyridoxine.

Although many methods are known for the preparation of vitamin $B_6$, only a few can be used for the commercial preparation of vitamin $B_6$. This is, of course, due to the fact that vitamins, including $B_6$, are sold in a highly competitive market.

Accordingly, a major consideration in selecting a process is the cost of the starting materials as well as the economy by which the vitamin $B_6$ can be synthesized.

Heretofore, heterocyclic compounds of Formula I have been commercially prepared by cyclizing correspondingly substituted alanine derivatives. For example, 4-methyl-5-ethoxy-oxazole was prepared by cyclizing formyl-d,l-alaninate. The process of the present invention is advantageous in that it produces heterocyclic compounds of Formula I by decarboxylation of oxazolylacetic acid compounds of Formula II.

The oxazolylacetic acid compounds of Formula II are generally less costly than alanine derivatives and thus vitamin $B_6$ can be produced economically using the process of the present invention. The oxazolylacetic acid compounds of Formula II are readily prepared from aspartic acid derivatives.

The present invention comprises a new process for preparing heterocyclic compounds of Formula I. These compounds belong to a class of known compounds which compounds are, for example, useful as intermediates in the synthesis of pyridoxine.

The heterocyclic compounds of Formula I are represented by the formula

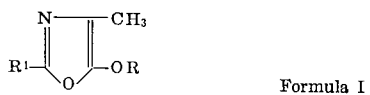

Formula I wherein R is lower alkyl, and $R^1$ is selected from the group consisting of a hydrogen atom and lower alkyl.

The heterocyclic compounds of Formula I are produced by decarboxylating an oxazolylacetic acid compound of the formula

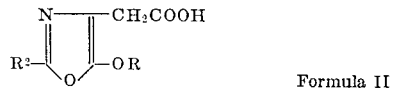

Formula II wherein R is as above defined, and $R^2$ is HC from the group consisting of a hydrogen atom, lower alkyl and carboxyl, in the presence of a dienophile of the formula

Formula III wherein A and B are trans and each represent an electron-withdrawing group.

As noted, R represents a lower alkyl group and $R^2$ a hydrogen atom, lower alkyl or carboxyl. Suitably, R will represent a lower alkyl group having up to six carbon atoms and $R^2$ will represent a hydrogen atom or carboxyl. In a preferred embodiment, R represents an ethyl group.

In accordance with custom and usage in the art, the term electron-withdrawing groups, as used herein, comprehend groups such as ester, nitrile, nitro, amido, sulphonyl and the like.

Where A and B of Formula III each represent a lower alkyl ester, such groups can, for example, be methyl, ethyl, propyl, butyl or amyl ester groups; preferably, a methyl or ethyl ester group. Exemplary compounds of Formula III include, for example, dimethyl fumarate, diethyl fumarate, di-n-butyl fumarate, dibenzyl fumarate, trans-dibenzoyl ethylene, benzalacetophenone, trans-1,2-bis(p-tolyl-sulphonyl)-ethylene and fumarodinitrile. In a preferred embodiment, the compound of Formula III is a di-(lower alkyl) fumarate; especially dimethyl or diethyl fumarate. Another preferred embodiment utilizes fumarodinitrile.

As noted, the compounds encompassed by Formula I can be produced by decarboxylating an oxazole of Formula II in the presence of a dienophile of Formula III. The reaction is desirably conducted at a temperature of from about 100° to about 150° C using catalytic amounts of the compounds of Formula III with or without an added solvent. For example, a catalytic amount may range from a trace to about one-tenth mol of the compound of Formula III per mol of the compound of Formula II. However to ensure a rapid course of reaction, it is expedient to use the compounds of Formula III in a molar ratio of from about one-tenth to about one-half mol per mol of compound of Formula II.

Where the reaction is carried out in the presence of an added solvent, the solvent should be inert to the reagents, i.e. the compounds of Formulae II and III. Exemplary solvents include, for example, toluene, xylene, paraffin oil, silicone oil and the like. In a preferred embodiment, the reaction is carried out in the absence of an added solvent at a temperature of from about 125° to about 150° C.

The above reaction, which uses a dienophile of Formula III, effects the decarboxylation of the acetic acid residue to a methyl group at C-4 of the oxazole compound of Formula II; and where $R^2$ in Formula II represents carboxyl, the reaction also effects removal of the optionally present carboxyl group.

Decarboxylation is evident when carbon dioxide evolves from the reaction mixture. The reaction is continued until carbon dioxide no longer evolves.

The following examples are given in further illustration of the invention.

EXAMPLE 1

Preparation of: 4-Methyl-5-Ethoxy-Oxazole 85.5 g of 5-ethoxy-4-oxazolylacetic acid (0.50 mol) and 57.07 g of fumaric acid di-n-butyl ester (0.50 mol) are placed in a 250 ml "Hickman" flask fitted with magnetic stirrer, heated in an oil-bath of 140° C at a partial vacuum of 300 mm (water-jet pump with control tap) and stirred. Decarboxylation is evident by the evolution of carbon dioxide gas. Using a control tap, the partial vacuum is held at 300 mm. The decarboxylation reaction ends after about 5 minutes. The partial vacuum is then regulated to 150 mm and the temperature of the oil-bath elevated to 170° C. Distillation is ended after about 40 minutes yielding: 4-methyl-5-ethoxy-oxazole.

Further and optional distillation proceeds by adding 85.5 g of 5-ethoxy-4-oxazolylacetic acid (0.50 mol) to the distillation product and the decarboxylation reaction is repeated yielding additional amounts of 4-methyl-5-ethoxy-oxazole. The decarboxylation is repeated with 85.5 g of 5-ethoxy-4-oxazoleacetic acid (0.50 mol) yielding further amounts of 4-methyl-5-ethoxy-oxazole. Gas chromatography indicated that the combined reaction product contained small amounts of di-n-butyl fumarate.

EXAMPLE 2

Preparation of: 4-Methyl-5-Ethoxy-Oxazole 17.1 g of 5-ethoxy-4-oxazolylacetic acid (0.10) and 12.8 g of fumaric acid diisoamyl ester (0.050 mol) are placed in a 200 ml "Hickman" flask fitted with a magnetic stirrer and heated in an oil-bath of 140° at a partial vacuum of 300 mm (water-jet vacuum with control tap). Stirring is begun while the reaction mixture is liquifying whereupon carbon dioxide evolves (decarboxylation). During the decarboxylation (which lasts about 5 minutes), the partial vacuum is held at 300 mm. The vacuum is then regulated to 150 mm of partial vacuum and the temperature of the oil-bath elevated to 170° C. Distillation for about 45 minutes yielded the reaction product: 4-methyl-5-ethoxy-oxazole. Gas chromatography indicated that the reaction product contains only traces of di-isoamyl fumarate.

EXAMPLE 3

Preparation of: 4-Methyl-5-Ethoxy-Oxazole

Using the procedure described in Examples 1 and 2, 4-methyl-5-ethoxy-oxazole was prepared from 5-ethoxy-4-oxazolylacetic acid (17.1 g [0.10 mol]) and dimethyl fumarate (7.2 g [0.050 mol]). Gas chromatography indicated that the reaction product contains small amounts of unreacted dimethyl fumarate.

EXAMPLE 4

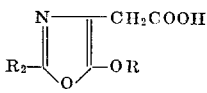

Using the procedure described in Examples 1 and 2, 4-methyl-5-ethoxy-oxazole was prepared from 5-ethoxy-4-oxazolylacetic acid (34.2 g [0.20 mol]) and diethyl fumarate (17.2 g [0.10 mol]). Gas chromatography indicated that the reaction product contains small amounts of unreacted diethyl fumarate.

EXAMPLE 5

Preparation of: 4-Methyl-5-Ethoxy-Oxazole

Using the procedure described in Examples 1 and 2, 4-methyl-5-ethoxy-oxazole was prepared from 5-ethoxy-4-oxazolylacetic acid (34.2 g [0.20 mol]) and diethyl fumarate (8.6 g [0.50 mol]). Gas chromatography indicated that the reaction product contains small amounts of unreacted diethyl fumarate.

EXAMPLE 6

Preparation of: 4-Methyl-5-Ethoxy-Oxazole

Using the procedure described in Examples 1 and 2, 4-methyl-5-ethoxy-oxazole was prepared from 5-ethoxy-4-oxazolylacetic acid (17.1 g [0.10 mol]) and dibenzyl fumarate (14.8 g [0.050 mol]). Gas chromatography indicated that the reaction product is practically pure.

EXAMPLE 7

Preparation of: 4-Methyl-5-Ethoxy-Oxazole

Using the procedure described in Examples 1 and 2, 4-methyl-5-ethoxy-oxazole was prepared from 5-ethoxy-4-oxazolylacetic (17.1 g [0.10 mol]) and fumarodinitrile (3.9 g [0.050 mol]). Gas chromatography indicated that the reaction product contains small amounts of unreacted fumarodinitrile.

EXAMPLE 8

Preparation of: 4-Methyl-5-Ethoxy-Oxazole

Using the procedure described in Examples 1 and 2, 4-methyl- 5-ethoxy-oxazole was prepared from 5-ethoxy-'4-oxazolylacetic acid (17.1 g [0.10 mol]) and trans-dibenzoylethylene (118.8 g [0.050 mol]). Gas chromatography indicated that the reaction product is practically pure.

EXAMPLE 9

Preparation of: 4-Methyl-5-Ethoxy-Oxazole

Using the procedure described in Examples 1 and 2, 4-methyl-5-ethoxy-oxazole was prepared from 5-ethoxy-4-oxazolylacetic acid (17.1 g [0.10 mol]) and trans-benzalacetophenone (10.4 g [0.050 mol]). Gas chromatography indicated that the reaction product is practically pure.

EXAMPLE 10

Preparation of: 4-Methyl-5-Ethoxy-Oxazole

Using the procedure described in Examples and 2, 4-methyl-5-ethoxy-oxazole was prepared from 5-ethoxy-4-oxazolylacetic acid (17.1g [0.10 mol]) and trans-1, 2-bis(p-tolylsulphonyl)-ethylene (16.8 g [0.050 mol]). Gas chromatography indicated the reaction product is practically pure.

EXAMPLE 11

Preparation of: 4-Methyl-5-Ethoxy-Oxazole 15.7 g of 5-methoxy-4-oxazolylacetic acid (0.10 mol) and 14.8 g of dibenzyl fumarate (0.050 mol) are placed in a 100 ml "Hickman" flask fitted with a magnetic stirrer and heated at a partial vacuum of 300 mm (water-jet pump with control tap) in an oil-bath of 140° and stirred. Decarboxylation is evident by the evolution of carbon dioxide gas. During the decarboxylation, which lasts about 5 minutes, the partial vacuum is held at 300 mm. The vacuum is then regulated to 150 mm of partial vacuum and the temperature of the oil-bath elevated to 170° C. Distillation for about 45 minutes yielded: 4-methyl-5ethoxy-oxazole. Gas chromatography indicated that the reaction product is practically pure.

EXAMPLE 12

Preparation of 4-Methyl-5-Isopropoxy-Oxazole

Using the procedure described in Examples 1 and 2, 4-methyl-5-isopropoxy-oxazole was prepared from 5-isopropoxy-4-oxazolylacetic acid (18.5 g [0.10 mol]) and dibenzyl fumarate (14.8 g [0.050 mol]). Gas chromatography indicated that the reaction product is practically pure.

EXAMPLE 13

Preparation of 2,4-Dimethyl-5-Ethoxy-Oxazole 5.55 g of 2-methyl-5-ethoxy-4-oxazolylacetic acid (0.030 mol) and 3.42 g of di-n-butyl fumarate (0.015 mol) are placed in a 20 ml "Hickman" flask fitted with a magnetic stirrer, heated at a partial vacuum of 300 mm (water-jet pump with control tap) in an oil-bath of 140° and stirred. Decarboxylation is evident by the evolution (about 5 minutes) of carbon dioxide gas. The partial vacuum is subsequently regulated to 150 mm and the temperature of the oil-bath elevated to 170° C. Distillation of the reaction product over a 30 minute period yielded: 2,4-dimethyl-5-ethoxy-oxazole. Gas chromatography indicated that the reaction product is pure, $n_D^{20} = 1.4410$

EXAMPLE 14

Preparation of: 4-Methyl-5-Ethoxy-Oxazole 21.5 g of 2-carboxy-5-ethoxy-4-oxazolylacetic acid (0.1 mol) and 8.6 g of fumaric acid diethyl ester (0.05 mol) are placed in a 100 ml "Hickman" flask and the mixture heated to 110° C in an oil-bath. Decarboxylation is evident by the evolution of carbon dioxide gas which lasts about 10 minutes. The oil-bath temperature is then slowly elevated to 200° C, thereby effecting complete decarboxylation in position 4and the 4-methyl-5-ethoxy-oxazole begins to distill. Distillation yielded: 4-methyl-5-ethoxy-oxazole. Gas chromatography indicated that the reaction product is pure.

I claim:

1. A process for the preparation of a compound of the formula

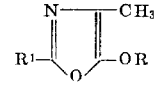

Formula I wherein R is lower alkyl, and $R^1$ is selected from the group consisting of a hydrogen atom and lower alkyl, which process comprises heating an oxazole of the formula

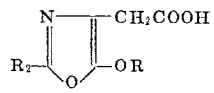

Formula II wherein R is as above defined, and
$R^2$ is selected from the group consisting of a hydrogen atom, lower alkyl and carboxyl,
in the presence of a dienophile of the formula

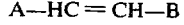

Formula III wherein A and B are trans and each represent an electron-withdrawing group, at a temperature of from about 100° to about 150° C. until carbon dioxide evolution has substantially ceased, and separating the reaction product of formula I from the reaction mixture.

2. The process of claim 1 wherein A and B are each selected from the group consisting of ester, nitrile, nitro, amido and sulphonyl.

3. The process of claim 2 wherein the dienophile of Formula III is a di-(lower alkyl) fumarate.

4. The process of claim 1 wherein $R^2$ is hydrogen and $R^1$ is hydrogen.

5. The process of claim 1 wherein $R^2$ is carboxyl and $R^1$ is hydrogen.

6. The process of claim 1 wherein $R^2$ is lower alkyl and $R^1$ is lower alkyl.

* * * * *